(12) United States Patent
Satoh et al.

(10) Patent No.: US 11,835,539 B2
(45) Date of Patent: Dec. 5, 2023

(54) LOW HEAT-RESISTANT SENSOR

(71) Applicant: Valqua, Ltd., Tokyo (JP)

(72) Inventors: Hisataka Satoh, Gojo (JP); Tetsuya Komeda, Gojo (JP)

(73) Assignee: VALQUA, LTD., Tokyo (JP)

( * ) Notice: Subject to any disclaimer, the term of this patent is extended or adjusted under 35 U.S.C. 154(b) by 0 days.

(21) Appl. No.: 17/769,007

(22) PCT Filed: Sep. 28, 2020

(86) PCT No.: PCT/JP2020/036579
§ 371 (c)(1),
(2) Date: Apr. 14, 2022

(87) PCT Pub. No.: WO2021/075248
PCT Pub. Date: Apr. 22, 2021

(65) Prior Publication Data
US 2023/0160919 A1    May 25, 2023

(30) Foreign Application Priority Data

Oct. 17, 2019 (JP) ................. 2019-190082

(51) Int. Cl.
| | |
|---|---|
| *G01P 1/02* | (2006.01) |
| *G01D 11/24* | (2006.01) |
| *G01P 5/08* | (2006.01) |
| *G01P 15/08* | (2006.01) |

(52) U.S. Cl.
CPC ............ *G01P 1/023* (2013.01); *G01D 11/245* (2013.01); *G01P 1/02* (2013.01); *G01P 15/08* (2013.01); *G01P 15/0802* (2013.01)

(58) Field of Classification Search
CPC ......... G01P 1/023; G01P 1/02; G01P 15/0802
See application file for complete search history.

(56) References Cited

U.S. PATENT DOCUMENTS

| | | | |
|---|---|---|---|
| 8,581,354 B2 | 11/2013 | Fujimori et al. | |
| 2004/0227343 A1* | 11/2004 | Takagi | F16L 27/111 285/903 |
| 2007/0010138 A1* | 1/2007 | Ohnishi | B60R 21/01 439/736 |
| 2008/0128841 A1 | 6/2008 | Fujimori et al. | |
| 2010/0223995 A1* | 9/2010 | Watanabe | G01D 3/028 73/431 |

(Continued)

FOREIGN PATENT DOCUMENTS

| | | | | |
|---|---|---|---|---|
| DE | 102010039329 A1 * | 2/2012 | ....... B29C 45/14639 |
| EP | 3761505 A1 | 1/2021 | |

(Continued)

*Primary Examiner* — Helen C Kwok
(74) *Attorney, Agent, or Firm* — THE WEBB LAW FIRM

(57) ABSTRACT

A low heat-resistant sensor that has high chemical resistance, excellent drip-proof properties, and excellent dust-proof properties is provided. The low heat-resistant sensor includes a sensor body that includes a sensor unit that is disposed in a housing and a cable that is electrically connected to the sensor unit of the sensor body. The housing of the sensor body is composed of fluorine resin, the cable is covered by a tube composed of fluorine resin, a portion at which the housing and the tube are connected to each other is thermally bonded, and the housing and the tube are integrally formed.

6 Claims, 12 Drawing Sheets

(56) References Cited

U.S. PATENT DOCUMENTS

| | | | |
|---|---|---|---|
| 2015/0377713 A1* | 12/2015 | Shibayama | G01K 1/08 |
| | | | 374/208 |
| 2016/0201542 A1* | 7/2016 | Yonezu | G01N 27/4062 |
| | | | 60/276 |
| 2016/0202128 A1* | 7/2016 | Kato | G01K 13/02 |
| | | | 374/208 |
| 2017/0159970 A1 | 6/2017 | Castaneda | |
| 2018/0252564 A1* | 9/2018 | Tashiro | G01F 1/6842 |
| 2019/0085142 A1* | 3/2019 | Kasai | C08J 5/18 |
| 2020/0399120 A1 | 12/2020 | Sone et al. | |

FOREIGN PATENT DOCUMENTS

| | | | | |
|---|---|---|---|---|
| JP | H01170929 U | 12/1989 | | |
| JP | 2004009318 A | 1/2004 | | |
| JP | 2005285501 A | 10/2005 | | |
| JP | 2008140867 A | 6/2008 | | |
| JP | 2012032363 A | 2/2012 | | |
| JP | 2016130633 A | 7/2016 | | |
| JP | 2017092192 A | 5/2017 | | |
| WO | WO-2013061785 A1 * | 5/2013 | | G01L 19/147 |
| WO | 2019167865 A1 | 9/2019 | | |
| WO | WO-2021075249 A1 * | 4/2021 | | G01L 19/147 |

\* cited by examiner

[Fig. 1]
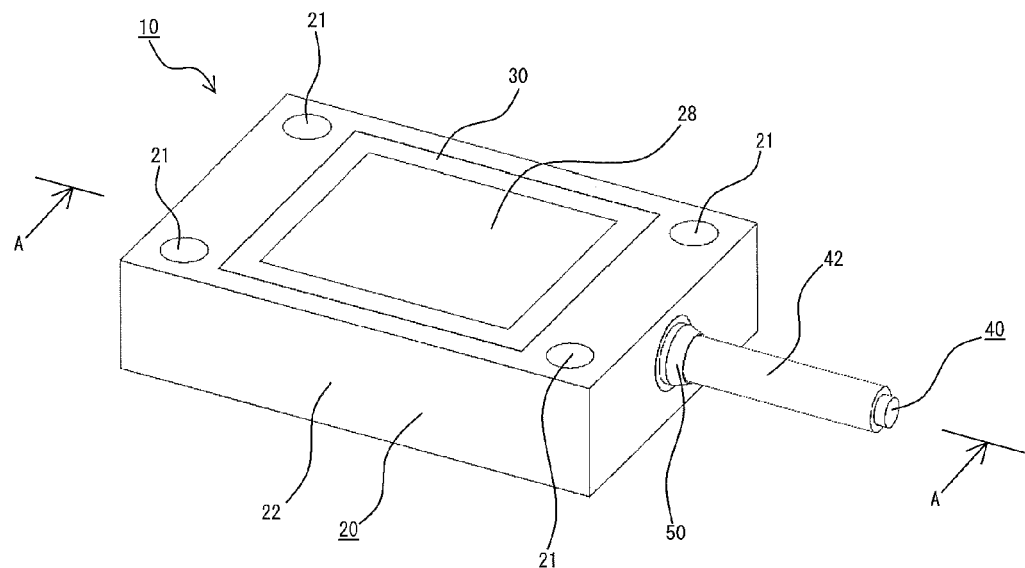
[Fig. 2]
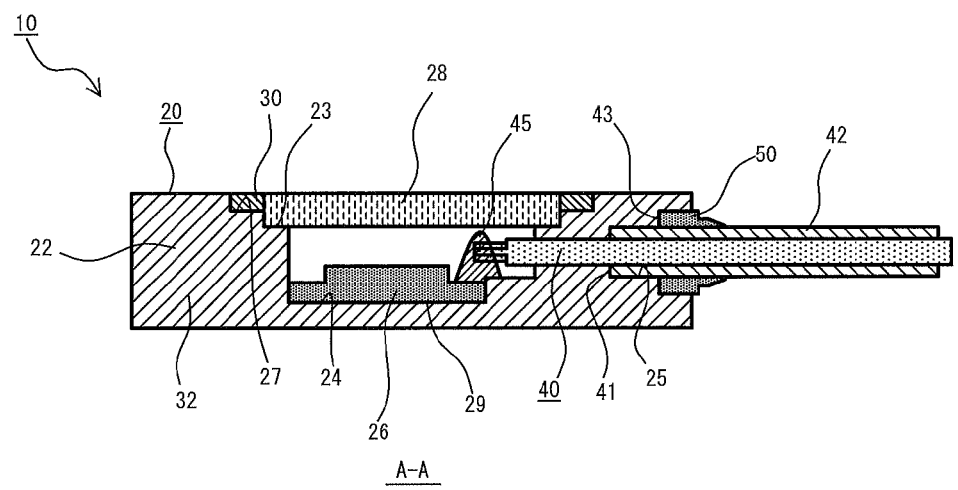
A-A

[Fig. 3]
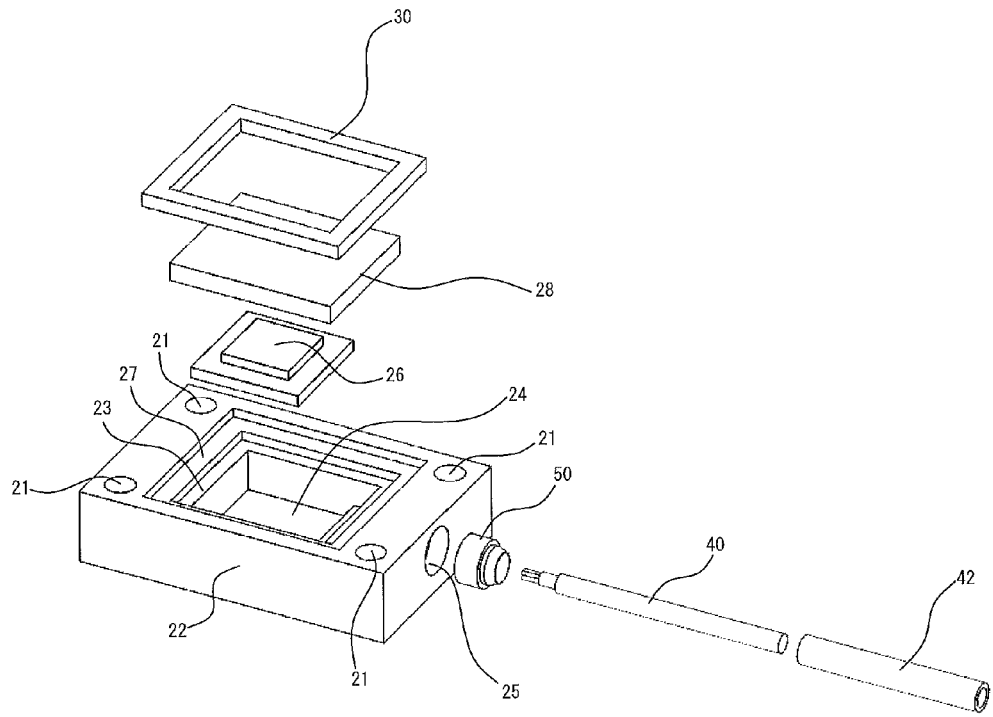
[Fig. 4]
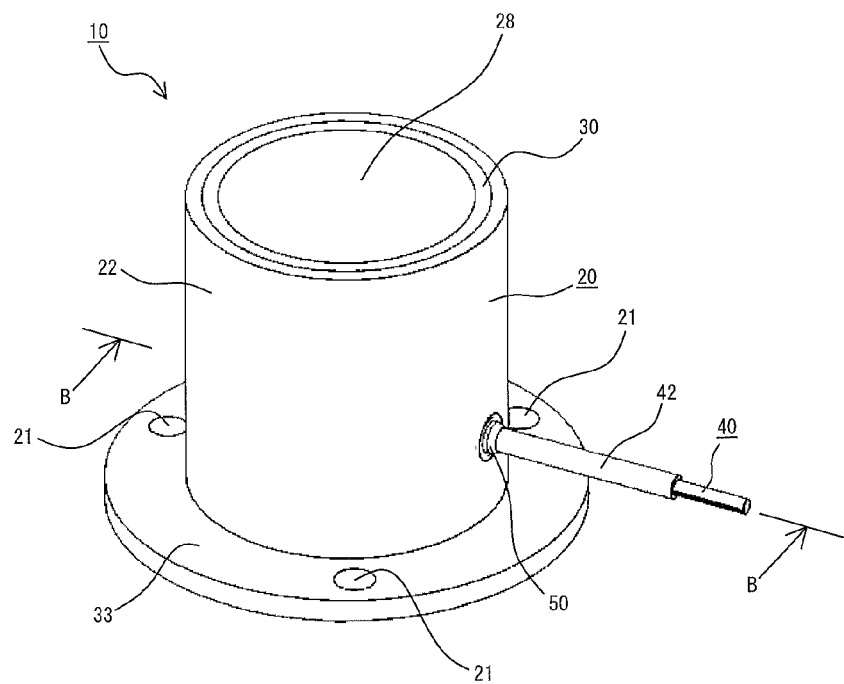

[Fig. 5]
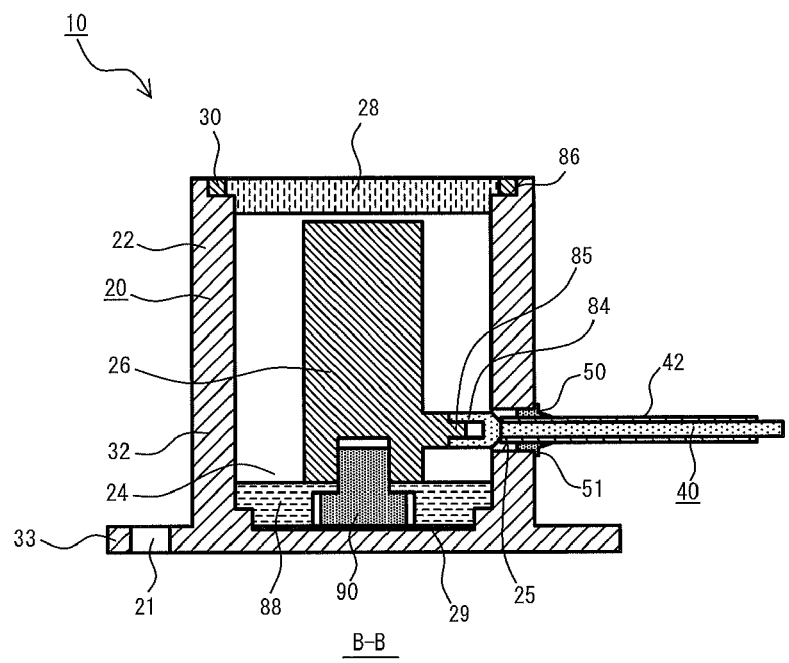
[Fig. 6]
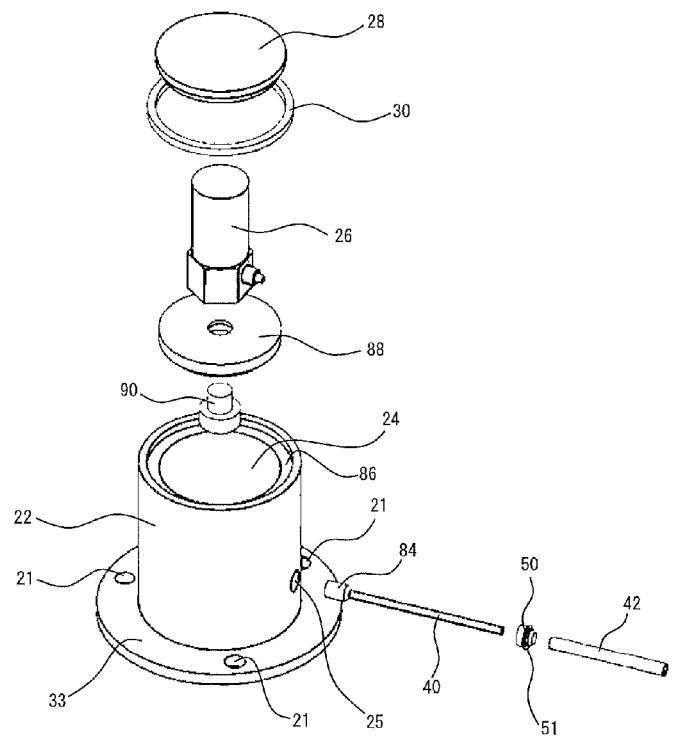

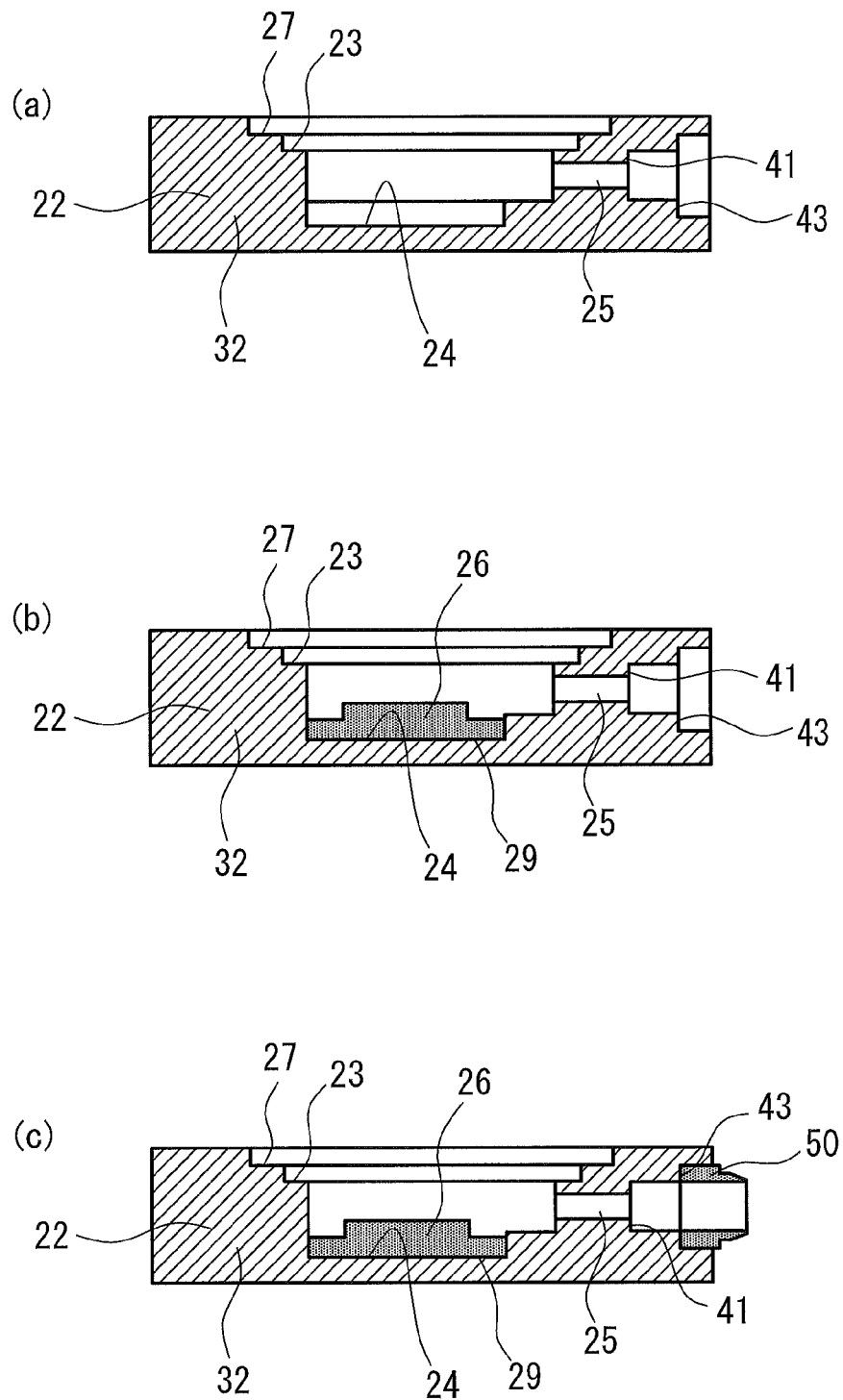
[Fig. 7]

[Fig. 8]
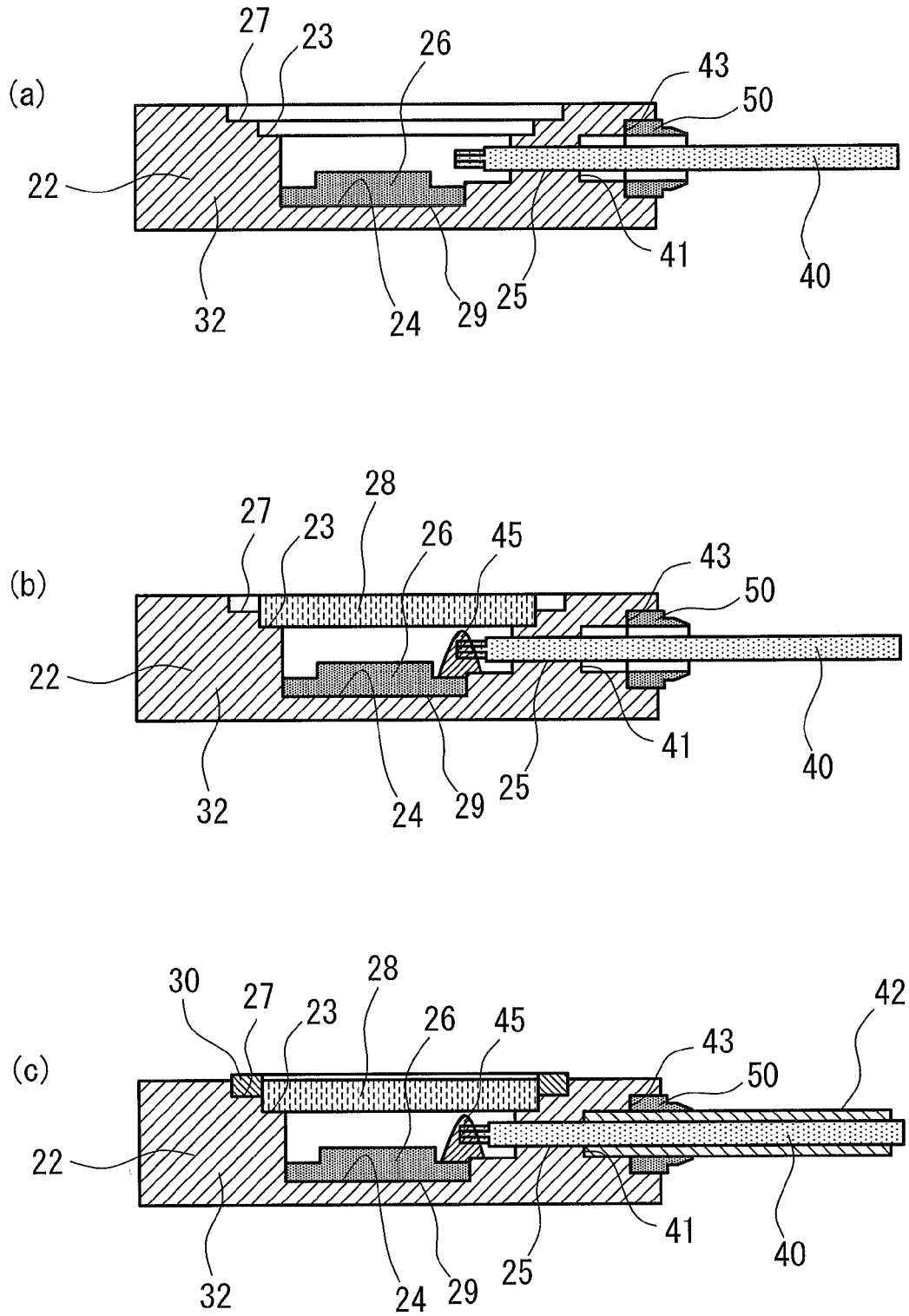

[Fig. 9]
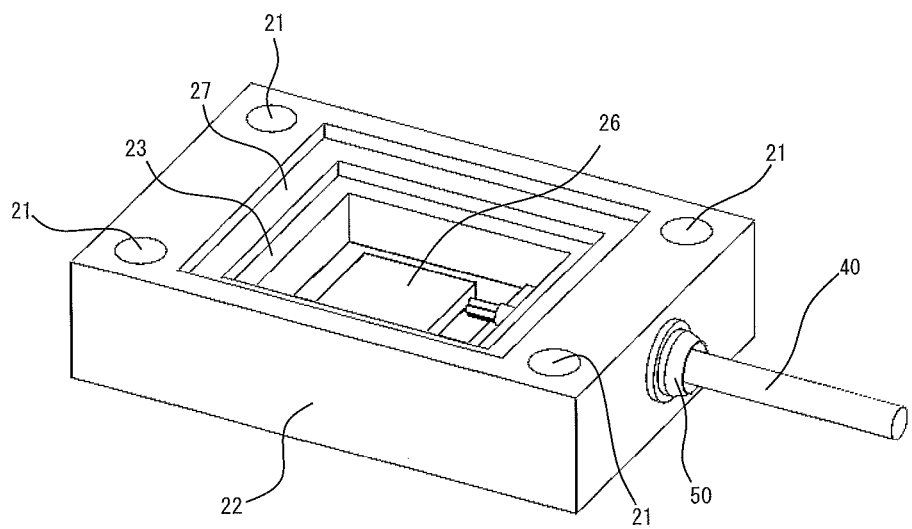
[Fig. 10]
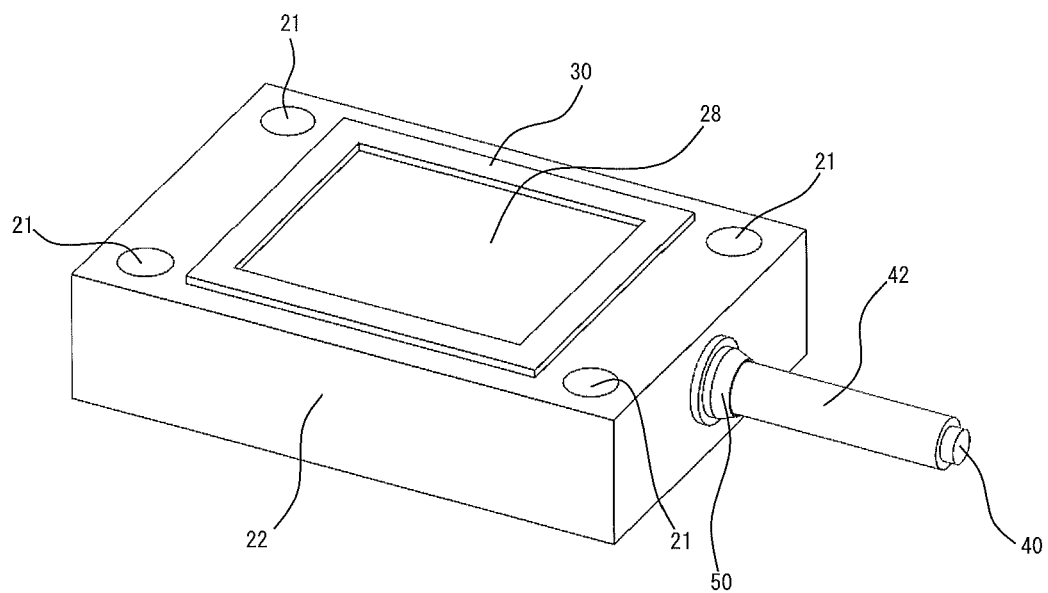

[Fig. 11]
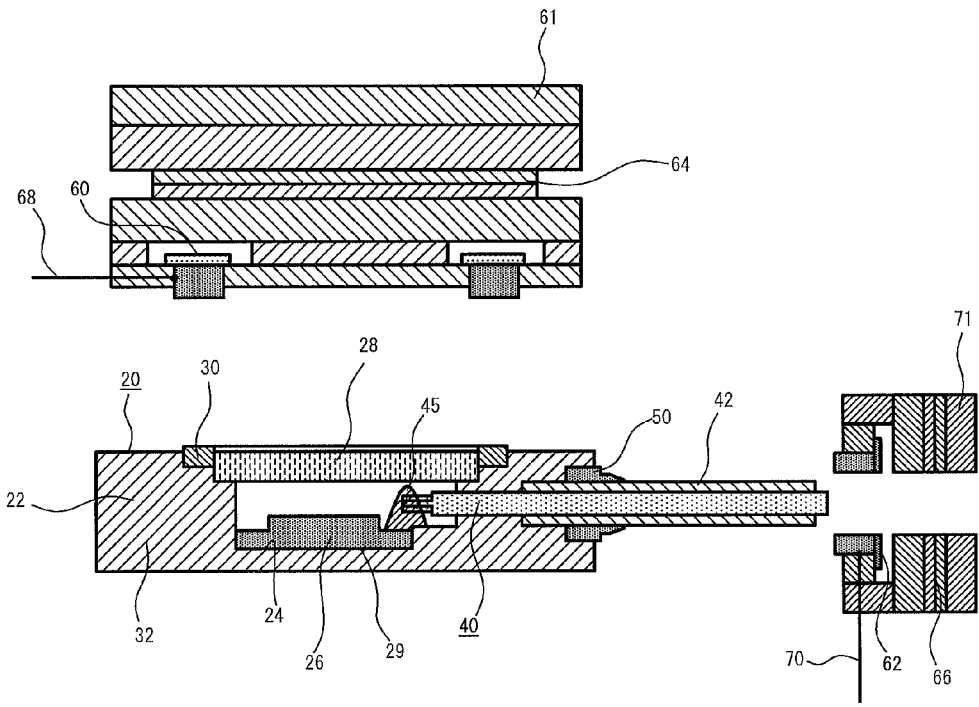
[Fig. 12]
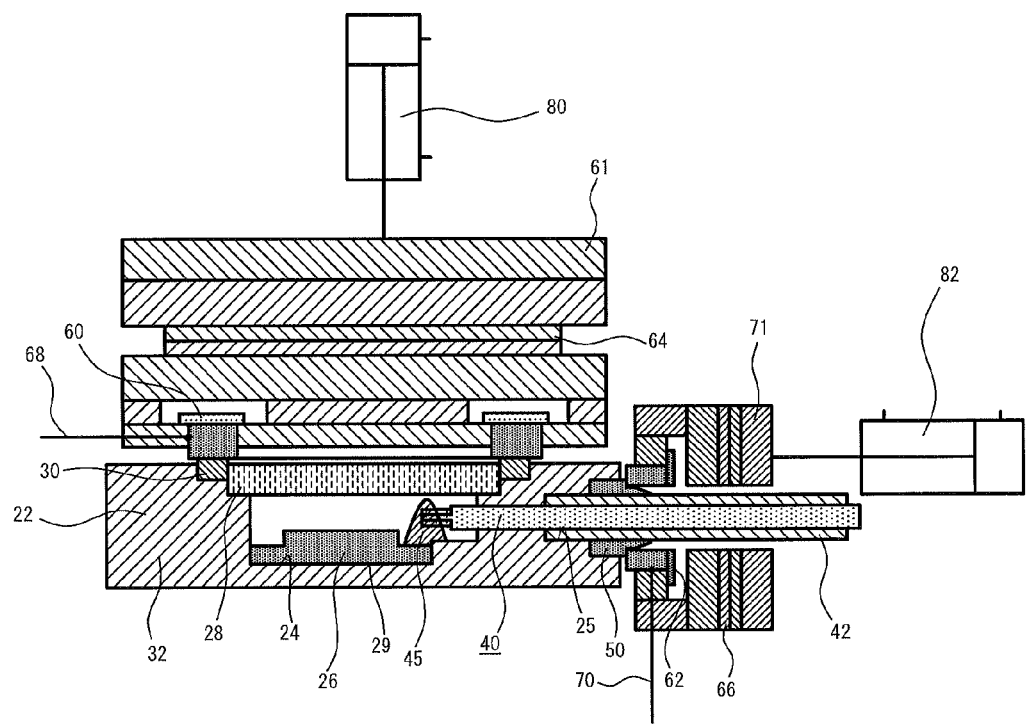

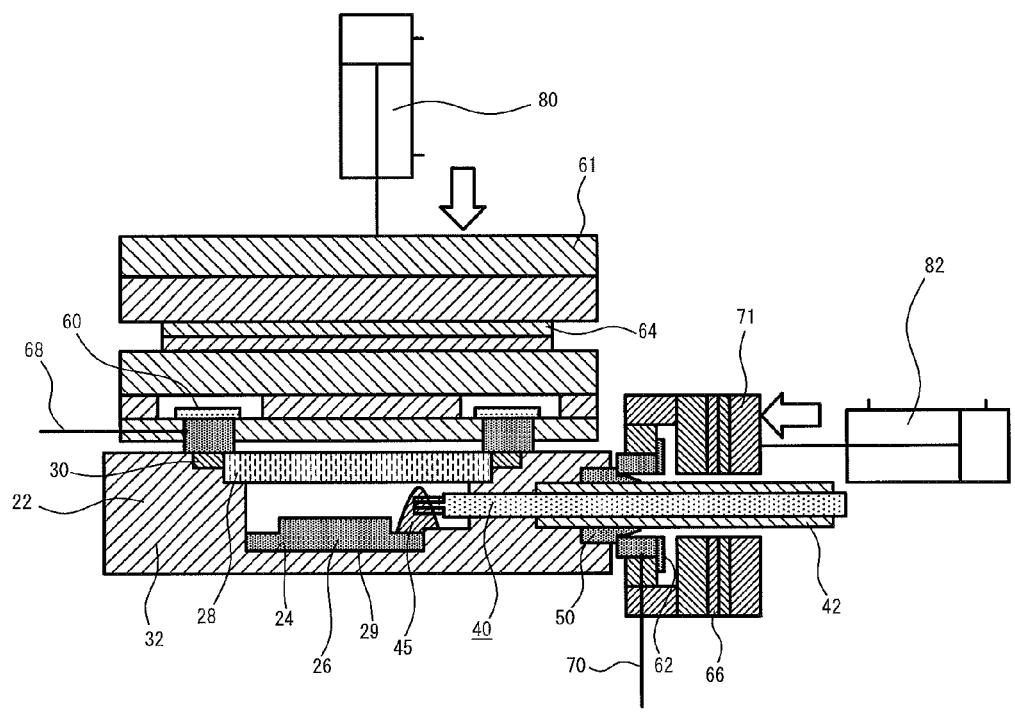
[Fig. 13]

[Fig. 14]
(a)
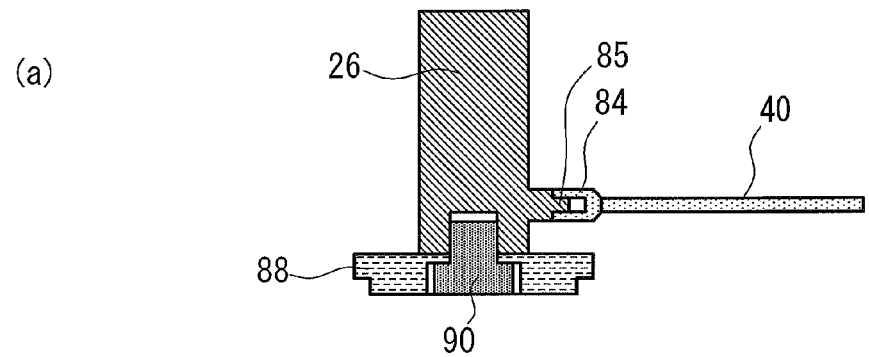
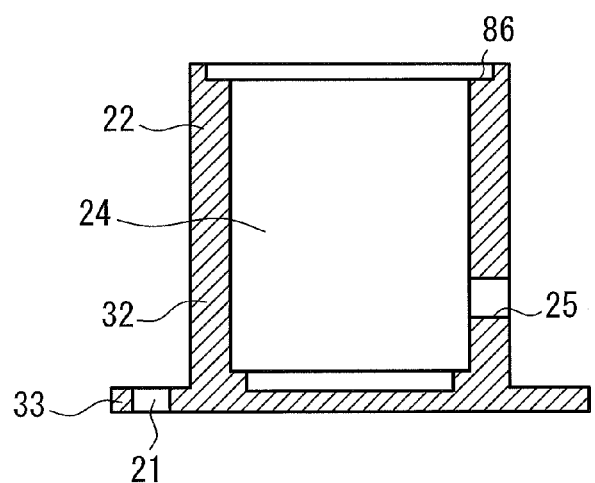
(b)
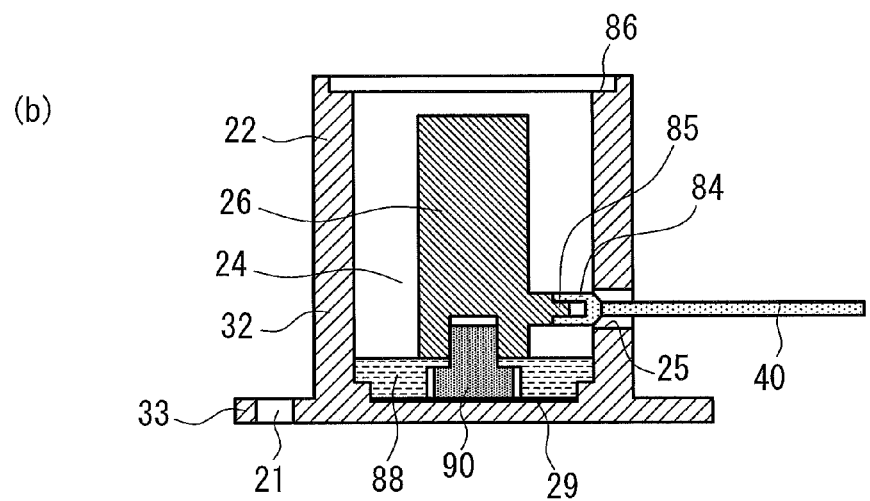

[Fig. 15]
(a)
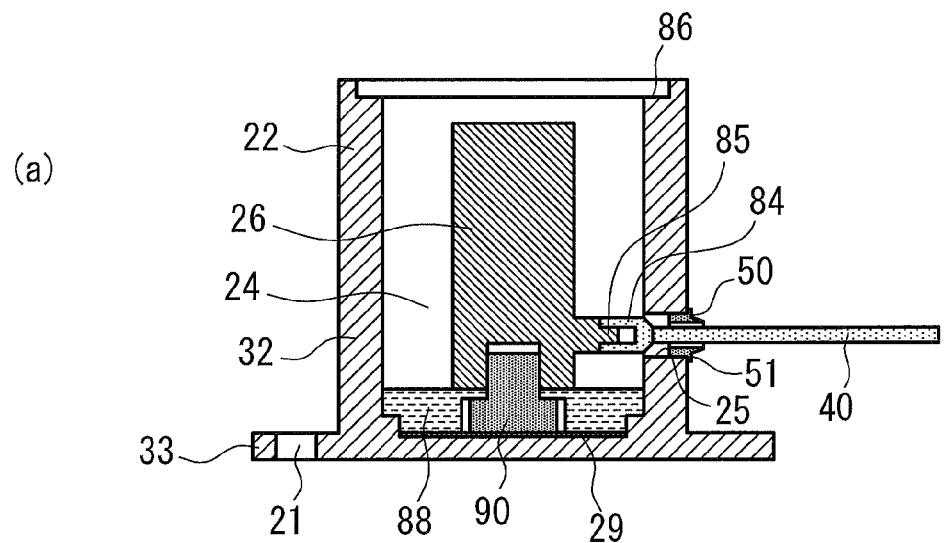
(b)
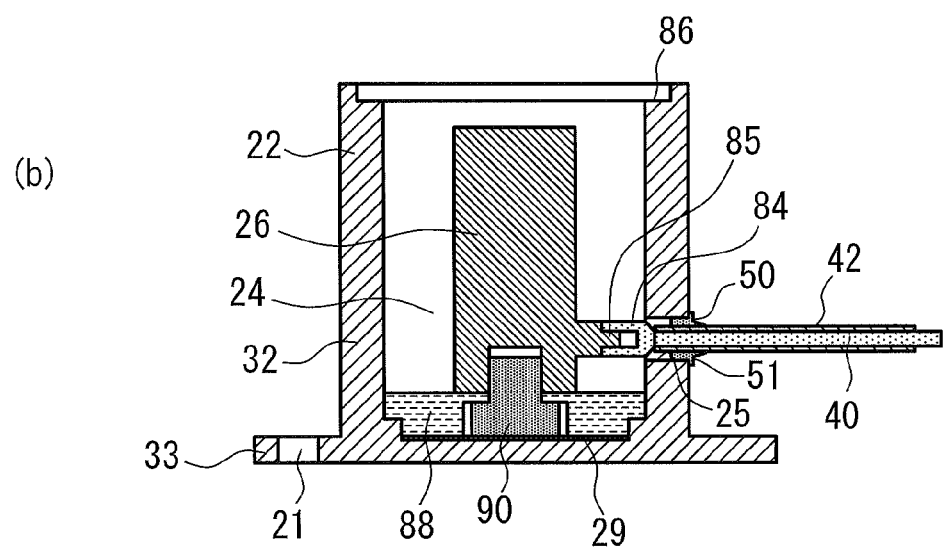

[Fig. 16]
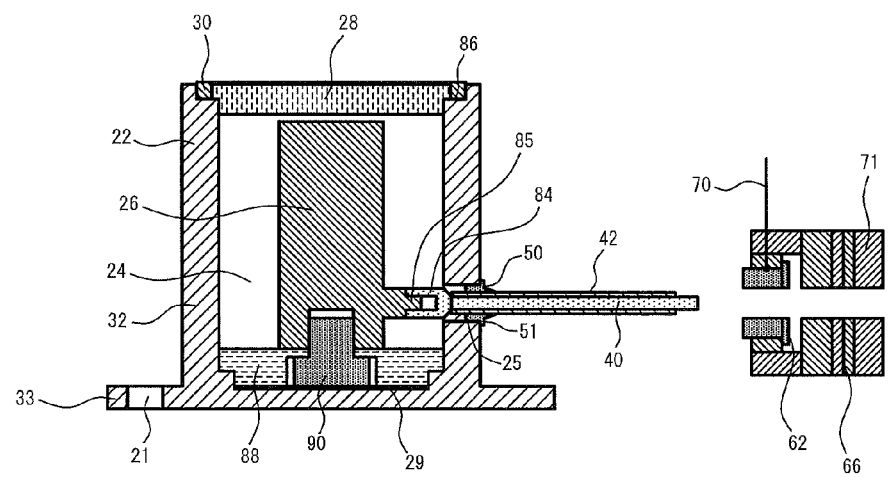
[Fig. 17]
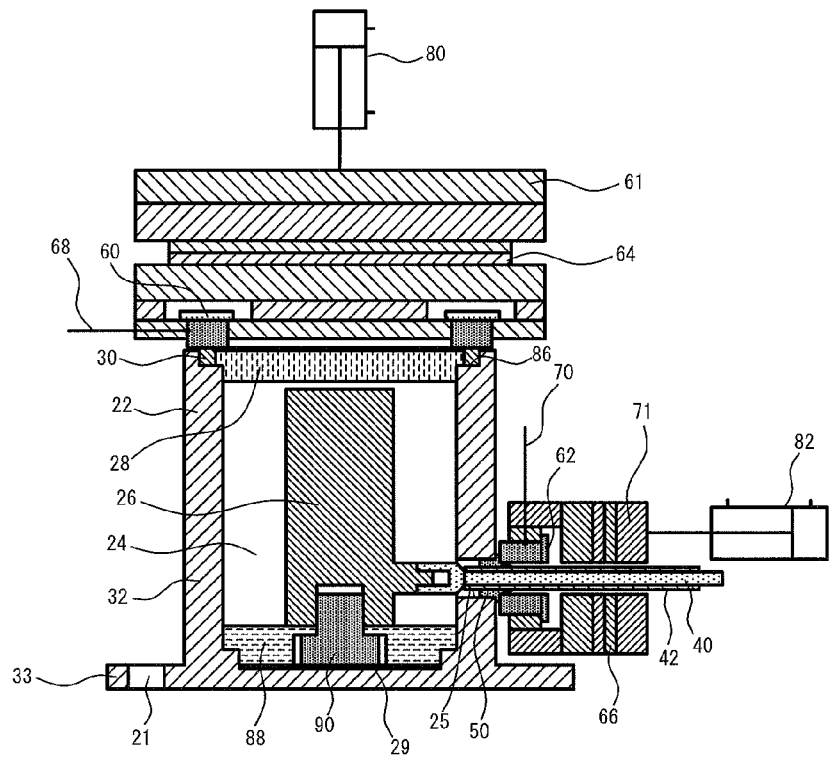

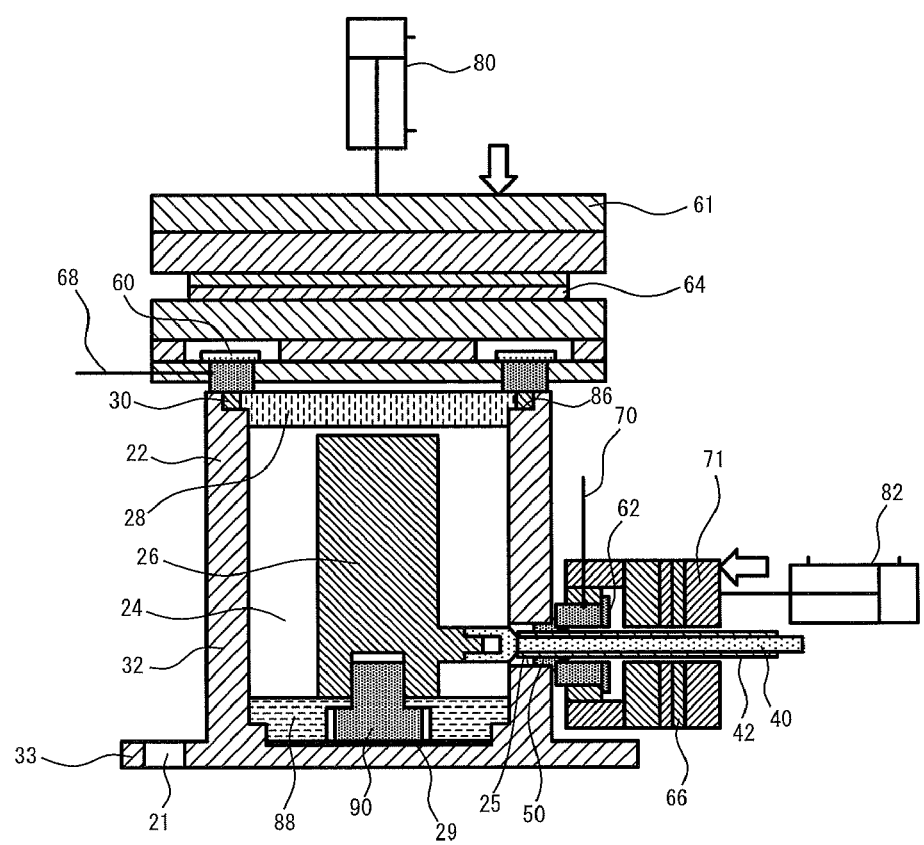
[Fig. 18]

LOW HEAT-RESISTANT SENSOR

CROSS-REFERENCE TO RELATED APPLICATIONS

This application is the United States national phase of International Application No. PCT/JP2020/036579 filed Sep. 28, 2020, and claims priority to Japanese Patent Application No. 2019-190082 filed Oct. 17, 2019, the disclosures of which are hereby incorporated by reference in their entirety.

TECHNICAL FIELD

The present invention relates to a low heat-resistant sensor that is used for industrial equipment such as a vibration-measuring instrument.

BACKGROUND ART

Various sensors such as an acceleration sensor, a temperature sensor, and a pressure sensor have been used for various kinds of industrial equipment. Such a sensor mainly includes a sensor body that contains a sensor unit that acquires various kinds of information in a housing and a cable that is electrically connected to the sensor unit of the sensor body.

In particular, for the housing of the sensor body, a metal material such as stainless steel or aluminum is used for the purpose of, for example, strength, a measure against a noise, or heat resistance, or a resin material is used for the purpose of, for example, insulation or a reduction in weight.

In some manufacturing sites such as factories, chemicals such as acid or alkaline chemicals are used, and industrial equipment is exposed to the chemicals. Sensor bodies or cables are coated with fluorine resin by being fired at a high temperature of 300 degrees or more, and consequently, many sensors that are exposed to the chemicals and that are used for industrial equipment typically have chemical resistance (for example, JPA 2016-130633).

SUMMARY OF INVENTION

Technical Problem

However, as for a low heat-resistant sensor the heat resistance temperature of which is low, which is represented by an acceleration sensor, among various sensors, the heat resistance temperature of a sensor unit of a sensor body is about 85 degrees or a low temperature of about 60 degrees in some cases, there is a possibility that the sensor unit is damaged in the case where a housing that contains the sensor unit is coated with fluorine resin as it is, and the sensor body cannot be coated with fluorine resin.

It is possible that only a cable is coated with fluorine resin, and that only the housing is coated with fluorine resin before containing the sensor unit. In this case, however, it is necessary that after the cable and the housing are separately coated with fluorine resin, that the sensor unit is disposed in the housing, and that the cable and the sensor body are electrically connected to each other. For this reason, the low heat-resistant sensor has a structure in which a small gap appears between the sensor body and the cable and cannot certainly prevent chemicals from entering the sensor body from a portion at which the sensor body and the cable are connected to each other.

From the possibility of the entering of the chemicals, entering of water or dust is naturally assumed. These adversely affect the precision of the low heat-resistant sensor. For this reason, there is a need for development of a low heat-resistant sensor that is resistant to these.

The present invention has been accomplished in view of such circumstances, and it is an object of the present invention to provide a low heat-resistant sensor that has high chemical resistance, excellent drip-proof properties, and excellent dust-proof properties.

Solution to Problem

The present invention is invented to solve the problem of the existing technique described above. A low heat-resistant sensor according to the present invention includes a sensor body that includes a sensor unit that is disposed in a housing, and a cable that is electrically connected to the sensor unit of the sensor body. The housing of the sensor body is composed of fluorine resin, and the cable is covered by a tube composed of fluorine resin. A portion at which the housing and the tube are connected to each other is thermally bonded, and the housing and the tube are integrally formed.

In the case where the housing composed of fluorine resin and the tube composed of fluorine resin are thus integrally formed, there are no gaps in the entire low heat-resistant sensor, that is, the sensor unit and the cable are completely covered with the fluorine resin. For this reason, the low heat-resistant sensor has high chemical resistance, excellent drip-proof properties, and excellent dust-proof properties.

In the low heat-resistant sensor according to the present invention, the housing and the tube are thermally bonded to each other with a connection member that is composed of fluorine resin interposed therebetween.

A load is likely to be applied to the portion at which the housing and the tube are connected to each other, and repeated use rises the possibility of the appearance of a gap. However, in the case where the housing and the tube are thus thermally bonded to each other with the connection member that is composed of fluorine resin interposed therebetween, no gap appears between the housing and the tube due to the repeated use, and the low heat-resistant sensor can maintain high chemical resistance, excellent drip-proof properties, and excellent dust-proof properties.

In the low heat-resistant sensor according to the present invention, the housing includes a container that contains the sensor unit in a recessed portion and that is composed of fluorine resin, a plate that serves as a lid covering an opening of the recessed portion and that is composed of fluorine resin, and a frame body that is disposed such that the frame body surrounds a perimeter of the plate and that is composed of fluorine resin. The frame body and the container are thermally bonded to each other, and the frame body and the plate are thermally bonded to each other.

In the case where the frame body and the container are thus thermally bonded to each other, and the frame body and the plate are thus thermally bonded to each other, the sensor unit can be sealed in the housing without contact with the sensor unit, and the sensor unit can be prevented from being damaged due to heating during thermal bonding with certainty.

In the low heat-resistant sensor according to the present invention, the fluorine resin is polytetrafluoroethylene (PTFE) resin, tetrafluoroethylene-perfluoroalkyl vinyl ether copolymer (PFA) resin, tetrafluoroethylene-hexafluoropropylene copolymer (FEP) resin, tetrafluoroethylene-ethylene copolymer (ETFE) resin, polyvinylidene fluoride (PVDF)

resin, polychlorotrifluoroethylene (PCTFE) resin, chlorotrifluoroethylene-ethylene copolymer (ECTFE) resin, or polyvinyl fluoride (PVF) resin.

Such fluorine resin enables the low heat-resistant sensor to have particularly high chemical resistance, excellent drip-proof properties, and excellent dust-proof properties.

In the low heat-resistant sensor according to the present invention, the frame body and the connection member are composed of tetrafluoroethylene-perfluoroalkyl vinyl ether copolymer (PFA) resin.

In the low heat-resistant sensor according to the present invention, the container, the plate, and the tube are composed of polytetrafluoroethylene (PTFE) resin.

In the case where the frame body and the connection member are thus composed of the PFA resin, and the container, the plate, and the tube are thus composed of the PTFE resin, the container, the plate, and the tube hardly deform because the melting point of the PFA resin is lower than that of the PTFE resin, the frame body and the container can be thermally bonded to each other, the frame body and the plate can be thermally bonded to each other, the connection member and the container can be thermally bonded to each other, and the connection member and the tube can be thermally bonded to each other.

In the low heat-resistant sensor according to the present invention, the low heat-resistant sensor is MEMS (Micro Electro Mechanical Systems) or a pickup.

In the case where the low heat-resistant sensor is thus the MEMS or the pickup, characteristic structures according to the present invention can be suitably used.

The low heat-resistant sensor according to the present invention is an acceleration sensor.

In the case of the acceleration sensor as above, the effects of the structures according to the present invention can be increased.

A method of manufacturing a low heat-resistant sensor according to the present invention includes a step of disposing a sensor unit in a recessed portion of a container composed of fluorine resin, inserting a cable into a through-hole in communication with the recessed portion, and electrically connecting the sensor unit that is disposed in the recessed portion and the cable to each other, a step of disposing a plate composed of fluorine resin such that the plate covers an opening of the recessed portion and capping the recessed portion, a step of covering the cable by using a tube composed of fluorine resin, a step of disposing a frame body composed of fluorine resin such that the frame body surrounds the perimeter of the plate, a step of thermally bonding the frame body, the container, and the plate to each other, and a step of thermally bonding the container and the tube to each other.

The manufacturing method enables the low heat-resistant sensor that has high chemical resistance, excellent drip-proof properties, and excellent dust-proof properties to be manufactured because an integrally formed structure in which the sensor unit and the cable are completely covered with the fluorine resin is acquired.

In the method of manufacturing the low heat-resistant sensor according to the present invention, the step of thermally bonding the frame body, the container, and the plate to each other includes melting a part of the frame body by pressing the frame body against the sensor unit while heating the frame body, thermally bonding the frame body and the container to each other, and thermally bonding the frame body and the plate to each other.

In the case where the frame body and the container are thermally bonded to each other, and the frame body and the plate are thermally bonded to each other by pressing the frame body while heating the frame body as above, the sensor unit is not heated, the sensor unit can be sealed in the housing, and the sensor unit can be prevented from being damaged due to heating with certainty.

In the method of manufacturing the low heat-resistant sensor according to the present invention, the step of thermally bonding the container and the tube to each other includes thermally bonding the container and the tube to each other with a connection member that is composed of fluorine resin interposed therebetween.

In the method of manufacturing the low heat-resistant sensor according to the present invention, a part of the connection member is melted by pressing the connection member against the recessed portion while heating the connection member, the connection member and the container are thermally bonded to each other, and the connection member and the tube are thermally bonded to each other.

In the case where the container and the tube are thermally bonded to each other with the connection member that is composed of fluorine resin interposed therebetween, no gap appears at a portion at which the container and the tube are connected to each other even due to continuous use, and the low heat-resistant sensor that maintains high chemical resistance, excellent drip-proof properties, and excellent dust-proof properties can be manufactured.

Advantageous Effects of Invention

A low heat-resistant sensor according to the present invention has high chemical resistance, excellent drip-proof properties, and excellent dust-proof properties because a housing of a sensor body is composed of fluorine resin, a cable is covered by a tube composed of fluorine resin, and an integrally formed structure in which the housing and the tube are thermally bonded to each other is acquired.

A method of manufacturing a low heat-resistant sensor according to the present invention does not damage a sensor unit and enables the low heat-resistant sensor that has high chemical resistance, excellent drip-proof properties, and excellent dust-proof properties to be manufactured with certainty because an integrally formed structure in which the sensor unit and a cable are completely covered with fluorine resin can be acquired, and the sensor unit is not heated to a high temperature during manufacturing.

BRIEF DESCRIPTION OF DRAWINGS

FIG. 1 is a perspective view of a low heat-resistant sensor according to a first embodiment of the present invention.

FIG. 2 is a sectional view of the low heat-resistant sensor according to the first embodiment of the present invention illustrated in FIG. 1 taken along line A-A.

FIG. 3 is an exploded perspective view of the low heat-resistant sensor according to the first embodiment of the present invention.

FIG. 4 is a perspective view of a low heat-resistant sensor according to a second embodiment of the present invention.

FIG. 5 is a sectional view of the low heat-resistant sensor according to the second embodiment of the present invention illustrated in FIG. 4 taken along line B-B.

FIG. 6 is an exploded perspective view of the low heat-resistant sensor according to the second embodiment of the present invention.

FIG. 7 illustrate process diagrams illustrating the manufacturing processing of the low heat-resistant sensor according to the first embodiment of the present invention.

FIG. 8 illustrate process diagrams illustrating the manufacturing processing of the low heat-resistant sensor according to the first embodiment of the present invention.

FIG. 9 is a perspective view similar to the process diagram illustrated in FIG. 8(a).

FIG. 10 is a perspective view similar to the process diagram illustrated in FIG. 8(c).

FIG. 11 illustrates a process diagram illustrating a manufacturing process of the low heat-resistant sensor according to the first embodiment of the present invention.

FIG. 12 illustrates a process diagram illustrating a manufacturing process of the low heat-resistant sensor according to the first embodiment of the present invention.

FIG. 13 illustrates a process diagram illustrating a manufacturing process of the low heat-resistant sensor according to the first embodiment of the present invention.

FIG. 14 illustrate process diagrams illustrating the manufacturing processing of the low heat-resistant sensor according to the second embodiment of the present invention.

FIG. 15 illustrate process diagrams illustrating the manufacturing processing of the low heat-resistant sensor according to the second embodiment of the present invention.

FIG. 16 illustrates a process diagram illustrating a manufacturing process of the low heat-resistant sensor according to the second embodiment of the present invention.

FIG. 17 illustrates a process diagram illustrating a manufacturing process of the low heat-resistant sensor according to the second embodiment of the present invention.

FIG. 18 illustrates a process diagram illustrating a manufacturing process of the low heat-resistant sensor according to the second embodiment of the present invention.

DESCRIPTION OF EMBODIMENTS

Embodiments of the present invention will hereinafter be described in detail with reference to the drawings.

<Low Heat-resistant Sensor 10>

A low heat-resistant sensor 10 according to the present invention is a heat-sensitive sensor the heat resistance temperature of which is 100 degrees or less and is not particularly limited to any sensor. In particular, a sensor unit 26 described later includes, for example, a substrate or an integrated circuit in some cases, and these are heat-sensitive depending on the sensor in some cases. As for the low heat-resistant sensor 10 that includes the sensor unit 26 that is thus heat-sensitive, the present invention provides the low heat-resistant sensor 10 that has high chemical resistance, excellent drip-proof properties, and excellent dust-proof properties and a method of manufacturing the low heat-resistant sensor 10. An acceleration sensor can be taken as an example of the low heat-resistant sensor 10.

As illustrated in FIG. 1 to FIG. 3, the low heat-resistant sensor 10 according to a first embodiment of the present invention includes a sensor body 20 that includes the sensor unit 26 that is disposed in a housing 22 and a cable 40 that is electrically connected to the sensor unit 26 of the sensor body 20.

The housing 22 of the sensor body 20 is composed of fluorine resin. The cable 40 is covered by a tube 42 composed of fluorine resin. A portion at which the housing 22 and the tube 42 are connected to each other is thermally bonded, and the housing 22 and the tube 42 are integrally formed.

The structure of the housing 22 is not particularly limited provided that the sensor unit 26 is firmly contained in an interior space and can cover the entire sensor unit 26 with certainty.

As illustrated in FIG. 1 to FIG. 3, the housing 22 includes a container 32 that has a substantially rectangular cuboid shape and that includes a recessed portion 24 at the center, a plate 28 that is disposed above the sensor unit 26 and on a step portion 23 provided along the edge of an opening of the recessed portion 24 with the sensor unit 26 disposed in the recessed portion 24, that serves as a lid for the recessed portion 24, and that is composed of fluorine resin, and a frame body 30 that is disposed on a step portion 27 provided around the plate 28, that surrounds the plate 28, and that is composed of fluorine resin. In FIG. 1 and FIG. 3, reference signs 21 represent mounting holes that are used when the low heat-resistant sensor 10 is mounted on a mating member (not illustrated) by using a fastener, and the mounting holes 21 are through-holes that are not in communication with the recessed portion 24 of the housing 22 and that are independent.

In the case of the present example, the mounting holes 21 are provided at four positions, but the number is not particularly limited, and the mounting holes 21 themselves may not be provided. In the case where the mounting holes 21 are not provided, the low heat-resistant sensor 10 is mounted on the mating member (not illustrated) by using double-sided tape or an adhesive.

An integrally formed structure in which the frame body 30 and the container 32 are thermally bonded to each other and in which the frame body 30 and the plate 28 are thermally bonded to each other is acquired by pressing the frame body 30 while heating the frame body 30 as described later.

That is, a part of the frame body 30 is melted by being heated, the plate 28 and the container 32 are thermally bonded to each other with the frame body 30 interposed therebetween, and the frame body 30, the container 32, and the plate 28 are integrally formed.

The sensor unit 26 that is provided in the recessed portion 24 of the container 32 may be secured to the recessed portion 24 in any way but is preferably secured by using an adhesive 29. That is, the container 32 and the sensor unit 26 are integrally formed when the adhesive 29 is applied to the bottom surface of the recessed portion 24, the sensor unit 26 is disposed in the recessed portion 24 in this state, and the adhesive 29 is solidified. A low-siloxane content adhesive, for example, can be used as the adhesive 29.

A through-hole 25 in communication with the recessed portion 24 is provided in a side surface (a right-hand side surface in FIG. 1 to FIG. 3) of the housing 22. The cable 40 is inserted in the through-hole 25. The sensor unit 26 that is disposed in the recessed portion 24 and the cable 40 are electrically connected to each other by using, for example, solder 45.

The cable 40 that is electrically connected is covered by the tube 42 composed of fluorine resin. An end portion (a left-hand end portion in FIG. 1 and FIG. 2) of the tube 42 is inserted in the through-hole 25.

A step portion 41 for the tube 42 is provided in the through-hole 25. Consequently, the position of the tube 42 in the housing 22 is determined.

In addition, as illustrated in FIG. 2, a portion at which the tube 42 and the housing 22 are connected to each other is thermally bonded by using a connection member 50 composed of fluorine resin. That is, the connection member 50 is inserted in an end portion of the through-hole 25 of the housing 22. In this state, a part of the connection member 50 is melted by pressing the connection member 50 while heating the connection member 50. Consequently, the housing 22 (the container 32) and the tube 42 are thermally bonded to each other with the connection member 50 interposed therebetween and are integrally formed.

A step portion 43 for the connection member 50 is provided at the end portion of the through-hole 25 (a right-hand end portion in FIGS. 1 and 2). Consequently, the position of the connection member 50 at the side surface (the right-hand side surface in FIG. 1 to FIG. 3) of the housing 22 is determined.

Examples of the fluorine resin that is the materials of the housing 22, the plate 28, the frame body 30, the tube 42, and the connection member 50 include polytetrafluoroethylene (PTFE) resin, tetrafluoroethylene-perfluoroalkyl vinyl ether copolymer (PFA) resin, tetrafluoroethylene-hexafluoropropylene copolymer (FEP) resin, tetrafluoroethylene-ethylene copolymer (ETFE) resin, polyvinylidene fluoride (PVDF) resin, polychlorotrifluoroethylene (PCTFE) resin, chlorotrifluoroethylene-ethylene copolymer (ECTFE) resin, and polyvinyl fluoride (PVF) resin.

Among these, fluorine resin having a relatively low melting point is preferably selected for the frame body 30 and the connection member 50 because these are directly heated, and fluorine resin having a melting point higher than that of the fluorine resin that is used for the frame body 30 and the connection member 50 is preferably selected for the housing 22, the plate 28, and the tube 42.

In particular, tetrafluoroethylene-perfluoroalkyl vinyl ether copolymer (PFA) resin is preferably used for the frame body 30 and the connection member 50, and polytetrafluoroethylene (PTFE) resin is preferably used for the housing 22, the plate 28, and the tube 42.

However, these combinations are not particularly limited, and the resin of each of the housing 22, the plate 28, the frame body 30, the tube 42, and the connection member 50 may be changed and is freely selected appropriately.

As for the low heat-resistant sensor 10 according to the first embodiment of the present invention, the frame body 30 and the container 32 are thermally bonded to each other, and the frame body 30 and the plate 28 are thermally bonded to each other in the sensor body 20. Consequently, the integrally formed structure can be acquired by sealing the sensor unit 26 in the housing 22 without direct contact with the sensor unit 26, and the sensor unit 26 can be prevented from being damaged due to heating during thermal bonding with certainty, as described above.

In addition, since the cable 40 is covered by the tube 42, and the tube 42 and the housing 22 are thermally bonded to each other into the integrally formed structure, there are no gaps anywhere, and the low heat-resistant sensor 10 that has high chemical resistance, excellent drip-proof properties, and excellent dust-proof properties can be provided.

A low heat-resistant sensor 10 according to a second embodiment of the present invention will now be described.

The low heat-resistant sensor 10 illustrated in FIG. 4 to FIG. 6 basically has the same structure as that of the low heat-resistant sensor 10 according to the first embodiment illustrated in FIG. 1 to FIG. 3. Accordingly, like components are designated by like reference signs, and the detailed description thereof is omitted.

As illustrated in FIG. 4 to FIG. 6, the low heat-resistant sensor 10 according to the second embodiment of the present invention includes the sensor body 20 that includes the sensor unit 26 that is disposed in the housing 22 that has a substantially cylindrical shape and the cable 40 that is electrically connected to the sensor unit 26 of the sensor body 20. As for the sensor unit 26, a support plate 88 is mounted on a bottom portion by using a fastener 90.

The housing 22 of the sensor body 20 is composed of fluorine resin. The cable 40 is covered by the tube 42 composed of fluorine resin. A portion at which the housing 22 and the tube 42 are connected to each other is thermally bonded, and the housing 22 and the tube 42 are integrally formed.

As illustrated in FIG. 4 to FIG. 6, the housing 22 includes the container 32 that has a substantially cylindrical shape and that includes the recessed portion 24 at the center, the plate 28 that is disposed above the sensor unit 26 and on a step portion 86 provided along the edge of an opening of the recessed portion 24 with the sensor unit 26 disposed in the recessed portion 24, that serves as a lid for the opening of the recessed portion 24, and that is composed of fluorine resin, and the frame body 30 that is provided around the plate 28, that is disposed on the step portion 86, that surrounds the plate 28, and that is composed of fluorine resin.

The support plate 88 that is provided on the bottom portion of the sensor unit 26 is accurately fitted to a bottom portion of the recessed portion 24. Consequently, the sensor unit 26 can be held in the housing 22 with certainty.

A flange portion 33 that is provided at the lower end of the housing 22 has the mounting holes 21 that are used when the low heat-resistant sensor 10 is mounted on the mating member (not illustrated) by using a fastener. The mounting holes 21 are through-holes that are not in communication with the recessed portion 24 of the housing 22 and that are independent.

In the case of the present embodiment, the mounting holes 21 are provided at three positions, but the number is not particularly limited, and the mounting holes 21 themselves may not be provided. In the case where the mounting holes 21 are not provided, the low heat-resistant sensor 10 is mounted on the mating member (not illustrated) by using double-sided tape or an adhesive.

An integrally formed structure in which the frame body 30 and the container 32 are thermally bonded to each other and in which the frame body 30 and the plate 28 are thermally bonded to each other is acquired by pressing the frame body 30 while heating the frame body 30 as described later.

That is, a part of the frame body 30 is melted by being heated, the plate 28 and the container 32 are thermally bonded to each other with the frame body 30 interposed therebetween, and the frame body 30, the container 32, and the plate 28 are integrally formed.

The sensor unit 26 that is provided in the recessed portion 24 of the container 32 may be secured to the recessed portion 24 in any way but is preferably secured by using the adhesive 29. That is, the container 32 and the sensor unit 26 are integrally formed with the support plate 88 interposed therebetween when the adhesive 29 is applied to the bottom portion of the recessed portion 24, the sensor unit 26, together with the support plate 88, is disposed in the recessed portion 24 in this state, and the adhesive 29 is solidified. A low-siloxane content adhesive, for example, can be used as the adhesive 29.

The through-hole 25 in communication with the recessed portion 24 is provided in a side surface (a right-hand side surface in FIG. 4 to FIG. 6) of the housing 22. The cable 40 is inserted in the through-hole 25. An engagement projecting portion 85 of the sensor unit 26 that is disposed in the recessed portion 24 and an engagement recessed portion 84 that is provided at an end portion of the cable 40 are electrically connected to each other by recess-projection engagement. The sensor unit 26 and the cable 40 are not limited by electrical connection made by the recess-projection engagement, but soldering, for example, may be acceptable. As for the engagement recessed portion 84 and the engagement projecting portion 85, a projecting portion and a recessed portion may be conversely provided.

The cable 40 that is electrically connected is covered by the tube 42 composed of fluorine resin. An end portion (a left-hand end portion in FIG. 4 and FIG. 5) of the tube 42 is inserted in the through-hole 25.

In addition, as illustrated in FIG. 4 and FIG. 5, a portion at which the tube 42 and the housing 22 are connected to each other is thermally bonded by using the connection member 50 composed of fluorine resin. That is, the connection member 50 is inserted in the end portion of the through-hole 25 of the housing 22. In this state, a part of the connection member 50 is melted by pressing the connection member 50 while heating the connection member 50. Consequently, the housing 22 (the container 32) and the tube 42 are thermally bonded to each other with the connection member 50 interposed therebetween and are integrally formed.

A flange portion 51 is provided on the connection member 50. Consequently, when the connection member 50 is fitted into the through-hole 25, the flange portion 51 prevents the connection member 50 from excessively entering the back of the through-hole 25.

Examples of the fluorine resin that is the materials of the housing 22, the plate 28, the frame body 30, the tube 42, and the connection member 50 include polytetrafluoroethylene (PTFE) resin, tetrafluoroethylene-perfluoroalkyl vinyl ether copolymer (PFA) resin, tetrafluoroethylene-hexafluoropropylene copolymer (FEP) resin, tetrafluoroethylene-ethylene copolymer (ETFE) resin, polyvinylidene fluoride (PVDF) resin, polychlorotrifluoroethylene (PCTFE) resin, chlorotrifluoroethylene-ethylene copolymer (ECTFE) resin, and polyvinyl fluoride (PVF) resin.

Among these, fluorine resin having a relatively low melting point is preferably selected for the frame body 30 and the connection member 50 because these are directly heated, and fluorine resin having a melting point higher than that of the fluorine resin that is used for the frame body 30 and the connection member 50 is preferably selected for the housing 22, the plate 28, and the tube 42.

In particular, tetrafluoroethylene-perfluoroalkyl vinyl ether copolymer (PFA) resin is preferably used for the frame body 30 and the connection member 50, and polytetrafluoroethylene (PTFE) resin is preferably used for the housing 22, the plate 28, and the tube 42.

However, these combinations are not particularly limited, and the resin of each of the housing 22, the plate 28, the frame body 30, the tube 42, and the connection member 50 may be changed and is freely selected appropriately.

As for the low heat-resistant sensor 10 according to the second embodiment of the present invention, the frame body 30 and the container 32 are thermally bonded to each other, and the frame body 30 and the plate 28 are thermally bonded to each other in the sensor body 20. Consequently, the integrally formed structure can be acquired by sealing the sensor unit 26 in the housing 22 without direct contact with the sensor unit 26, and the sensor unit 26 can be prevented from being damaged due to heating during thermal bonding with certainty, as described above.

In addition, since the cable 40 is covered by the tube 42, and the tube 42 and the housing 22 are thermally bonded to each other into the integrally formed structure, there are no gaps anywhere, and the low heat-resistant sensor 10 that has high chemical resistance, excellent drip-proof properties, and excellent dust-proof properties can be provided.

<Method of Manufacturing Low Heat-Resistant Sensor 10>

A method of manufacturing the low heat-resistant sensor 10 according to the first embodiment of the present invention described above will now be described.

As illustrated in FIG. 7(*a*), the housing 22 that includes the recessed portion 24 for the sensor unit 26 and that is composed of fluorine resin is first prepared. Subsequently, as illustrated in FIG. 7(*b*), the adhesive 29 is applied to the bottom portion of the recessed portion 24 of the housing 22, the sensor unit 26 is disposed in the recessed portion 24 from above, the adhesive 29 is dried, and the sensor unit 26 is firmly secured to the recessed portion 24.

In addition, as illustrated in FIG. 7(*c*), the connection member 50 that is composed of fluorine resin is mounted in the through-hole 25 that is provided in a side portion of the housing 22.

Subsequently, as illustrated in FIG. 8(*a*) and FIG. 9, the cable 40 is inserted into the through-hole 25 such that the end portion of the cable 40 reaches a location in the recessed portion 24 of the housing 22.

In addition, as illustrated in FIG. 8(*b*), the sensor unit 26 and the cable 40 that is inserted in the through-hole 25 are soldered by using the solder 45, and the sensor unit 26 and the cable 40 are electrically connected to each other. The plate 28 is disposed above the sensor unit 26 that is disposed in the recessed portion 24 and on the step portion 23 that is provided along the edge of the opening of the recessed portion 24 such that the recessed portion 24 is capped with the plate 28.

Subsequently, as illustrated in FIG. 8(*c*) and FIG. 10, the frame body 30 composed of fluorine resin is disposed on the step portion 27 that is provided around the plate 28, and the plate 28 is surrounded by the frame body 30. At this time, the thickness of the frame body 30 is preferably set such that the frame body 30 protrudes from the plate 28 slightly upward.

In addition, as illustrated in FIG. 11, a heating and pressing apparatus 61 that presses the frame body 30 is disposed above the housing 22, and a heating and pressing apparatus 71 that heats and presses the connection member 50 is disposed laterally from the connection member 50.

Subsequently, as illustrated in FIG. 12, the heating and pressing apparatus 61 is moved to a location right above the frame body 30 by using a cylinder 80, and the heating and pressing apparatus 71 is moved to a location right next to the connection member 50 by using a cylinder 82.

As illustrated in FIG. 13, the frame body 30 is pressed by the heating and pressing apparatus 61 against the housing 22 by using the cylinder 80 and is heated for a predetermined time, a part of the frame body 30 is melted, the frame body 30 and the housing 22 are integrally formed, and the frame body 30 and the plate 28 are integrally formed.

In addition to this, the connection member 50 is pressed by the heating and pressing apparatus 71 against the housing 22 by using the cylinder 82 and is heated for a predetermined time, a part of the connection member 50 is melted, the connection member 50 and the housing 22 are integrally formed, and the connection member 50 and the tube 42 are integrally formed. Reference signs 60 and 62 represent heaters, and reference signs 68 and 70 represent thermocouples.

After integral formation, cooling apparatuses 64 and 66 of the heating and pressing apparatuses 61 and 71 are quickly started, and heated portions are cooled. A two-step Peltier element is preferably used as the cooling apparatuses 64 and 66.

After cooling for a predetermined time, the heating and pressing apparatuses 61 and 71 are withdrawn by the cylinders 80 and 82 in directions away from the housing 22. Consequently, the manufacture of the low heat-resistant sensor 10 illustrated in FIG. 1 and FIG. 2 ends.

A method of manufacturing the low heat-resistant sensor 10 according to the second embodiment of the present invention described above will now be described.

As illustrated in FIG. 14(a), the housing 22 that includes the recessed portion 24 for the sensor unit 26, that is composed of fluorine resin, and that has a cylindrical shape is first prepared.

In addition to the housing 22, the support plate 88 is mounted on the bottom portion of the sensor unit 26 by using the fastener 90, the engagement projecting portion 85 of the sensor unit 26 is fitted into the engagement recessed portion 84 of the cable 40 by the recess-projection engagement, and the sensor unit 26 and the cable 40 are electrically connected to each other.

Subsequently, as illustrated in FIG. 14(b), the adhesive 29 is applied to the bottom portion of the recessed portion 24 of the housing 22. In this state, the sensor unit 26 on which the cable 40 and the support plate 88 are mounted is disposed in the recessed portion 24 of the housing 22. At this time, the support plate 88 is preferably configured such that the support plate 88 is accurately fitted to the bottom portion of the recessed portion 24. The cable 40 extends from a location in the recessed portion 24 to a location outside the housing 22 via the through-hole 25. The adhesive 29 is dried, the sensor unit 26 is firmly secured to the recessed portion 24 with the support plate 88 interposed therebetween.

In addition, as illustrated in FIG. 15(a), the connection member 50 composed of fluorine resin is mounted in the through-hole 25 that is provided in the side portion of the housing 22.

Subsequently, as illustrated in FIG. 15(b), the tube 42 is inserted into the cable 40 such that the end portion of the tube 42 reaches the engagement recessed portion 84 at the end portion of the cable 40 that is located in the through-hole 25.

In addition, as illustrated in FIG. 16, the plate 28 is disposed above the sensor unit 26 that is disposed in the recessed portion 24 of the housing 22 and on the step portion 86 that is provided along the edge of the opening of the recessed portion 24 such that the recessed portion 24 is capped with the plate 28.

Subsequently, the frame body 30 composed of fluorine resin is disposed on the step portion 86 that is provided around the plate 28, and the plate 28 is surrounded by the frame body 30. At this time, the thickness of the frame body 30 is preferably set such that the frame body 30 protrudes from the plate 28 slightly upward.

In addition, the heating and pressing apparatus 61 that presses the frame body 30 is disposed above the housing 22, and the heating and pressing apparatus 71 that heats and presses the connection member 50 is disposed laterally from the connection member 50.

Subsequently, as illustrated in FIG. 17, the heating and pressing apparatus 61 is moved to a location right above the frame body 30 by using the cylinder 80, and the heating and pressing apparatus 71 is moved to a location right next to the connection member 50 by using the cylinder 82.

As illustrated in FIG. 18, the frame body 30 is pressed by the heating and pressing apparatus 61 against the housing 22 by using the cylinder 80 and is heated for a predetermined time, a part of the frame body 30 is melted, the frame body 30 and the housing 22 are integrally formed, and the frame body 30 and the plate 28 are integrally formed.

In addition to this, the connection member 50 is pressed by the heating and pressing apparatus 71 against the housing 22 by using the cylinder 82 and is heated for a predetermined time, a part of the connection member 50 is melted, the connection member 50 and the housing 22 are integrally formed, and the connection member 50 and the tube 42 are integrally formed. The reference signs 60 and 62 represent heaters, and the reference signs 68 and 70 represent thermocouples.

After integral formation, the cooling apparatuses 64 and 66 of the heating and pressing apparatuses 61 and 71 are quickly started, and heated portions are cooled. A two-step Peltier element is preferably used as the cooling apparatuses 64 and 66.

After cooling for a predetermined time, the heating and pressing apparatuses 61 and 71 are withdrawn by the cylinders 80 and 82 in directions away from the housing 22. Consequently, the manufacture of the low heat-resistant sensor 10 illustrated in FIG. 4 and FIG. 5 ends.

The low heat-resistant sensors 10 and the methods of manufacturing the low heat-resistant sensors 10 according to the present invention are described above. However, the structure of each low heat-resistant sensor 10, that is, the structure of the housing 22 that contains the sensor unit 26 is not particularly limited.

According to the present embodiment, MEMS (Micro Electro Mechanical Systems) (the first embodiment) and a pickup (the second embodiment) are used as the sensor unit 26, but this is not a limitation. For example, a piezoelectric element may be used other than these.

Also, the manufacturing methods according to the present invention are not limited by the order described above, but various modifications can be made without departing from the object of the present invention.

REFERENCE SIGNS LIST 10 low heat-resistant sensor
20 sensor body
21 mounting hole
22 housing
23 step portion
24 recessed portion
25 through-hole
26 sensor unit
27 step portion
28 plate
29 adhesive
30 frame body
32 container
33 flange portion
40 cable
41 step portion
42 tube
43 step portion
45 solder
50 connection member
51 flange portion
60 heater
61 heating and pressing apparatus
62 heater
64 cooling apparatus
66 cooling apparatus
68 thermocouple
70 thermocouple
71 heating and pressing apparatus
80 cylinder 82 cylinder
84 engagement recessed portion
85 engagement projecting portion
86 step portion
88 support plate
90 fastener

The invention claimed is:

1. A low heat-resistant sensor comprising:
a sensor body that includes a sensor unit that is disposed in a housing, wherein the housing includes:
   a container that contains the sensor unit in a recessed portion and that is composed of fluorine resin,
   a plate that serves as a lid covering an opening of the recessed portion and that is composed of fluorine resin, and
   a frame body that is disposed such that the frame body surrounds a perimeter of the plate and that is composed of fluorine resin,
   wherein the frame body and the container are thermally bonded to each other, and the frame body and the plate are thermally bonded to each other; and
a cable that is electrically connected to the sensor unit of the sensor body,
wherein the housing of the sensor body is composed of fluorine resin, and the cable is covered by a tube composed of fluorine resin, and
wherein a portion at which the housing and the tube are connected to each other is thermally bonded, and the housing and the tube are integrally formed.

2. The low heat-resistant sensor according to claim 1, wherein the housing and the tube are thermally bonded to each other with a connection member that is composed of fluorine resin interposed therebetween.

3. The low heat-resistant sensor according to claim 1, wherein the fluorine resin is polytetrafluoroethylene (PTFE) resin, tetrafluoroethylene-perfluoroalkyl vinyl ether copolymer (PFA) resin, tetrafluoroethylene-hexafluoropropylene copolymer (FEP) resin, tetrafluoroethylene-ethylene copolymer (ETFE) resin, polyvinylidene fluoride (PVDF) resin, polychlorotrifluoroethylene (PCTFE) resin, chlorotrifluoroethylene-ethylene copolymer (ECTFE) resin, or polyvinyl fluoride (PVF) resin.

4. The low heat-resistant sensor according to claim 2, wherein the frame body of the housing and the connection member are composed of tetrafluoroethylene-perfluoroalkyl vinyl ether copolymer (PFA) resin.

5. The low heat-resistant sensor according to claim 1, wherein the container, the plate, and the tube are composed of polytetrafluoroethylene (PTFE) resin.

6. The low heat-resistant sensor according to claim 1, wherein the low heat-resistant sensor is an acceleration sensor.

* * * * *